Patented May 4, 1926.

1,583,053

UNITED STATES PATENT OFFICE.

BJÖRN PER FERDINAND KJELLBERG, OF STOCKHOLM, SWEDEN.

METHOD OF RECOVERING VANADIUM COMPOUNDS FROM IRON ORES CONTAINING VANADIUM AND TITANIUM.

No Drawing.    Application filed May 6, 1925. Serial No. 28,509.

*To all whom it may concern:*

Be it known that I, BJÖRN PER FERDINAND KJELLBERG, a subject of the King of Sweden, residing at 68 Kungsgatan, Stockholm, in the Kingdom of Sweden, have invented certain new and useful Improvements in the Methods of Recovering Vanadium Compounds from Iron Ores Containing Vanadium and Titanium, of which the following is a specification.

The present invention has for its object a method of recovering vanadium compounds from iron ores containing vanadium and titanium by roasting the ores in a special manner and extracting the vanadium compounds from the roasted product.

It is a known fact that the vanadium contained in ores of the kind described is intimately combined with the magnetite. Judging from this fact it may be supposed that the vanadium is present in the ore in the form of a compound $FeO.V_2O_3$ which is composed in an analogous manner to magnetite $FeO.Fe_2O_3$.

Moreover, it is known that on roasting silicates containing ferrous oxide the same are decomposed so that silica $SiO_2$ is liberated. Judging from this known fact applicant made the supposition that on roasting ores containing vanadium and titanium the analogous thing would occur, i. e. that the compound $FeO.V_2O_3$ would be decomposed so that the oxygen compound of vanadium would be liberated. Applicant's experiments have shown that this supposition was fully correct.

Applicant's experiments have also shown that the manner of carrying out the roasting operation is of the greatest importance for making it possible to extract as great quantities of vanadium compounds as possible from the roasted product. Applicant has discovered that if the roasting is carried on too far, so that too high oxidation compounds of vanadium are formed, such vanadium compounds have the liability of combining themselves with other constituents of the ore, so that compounds are formed which are sparingly soluble. In such case it will be impossible to extract the vanadium compounds from the roasted product in an economical and practical manner.

However, if the roasting of the ore is carried out in such a manner that the vanadium is not wholly oxidized to $V_2O_5$, the vanadium compounds can easily be extracted from the roasted product by suitable dissolving agents, such as 5% sulphuric acid or diluted hydrochloric acid without any other constituents being at the same time dissolved in quantities to speak of. The vanadium compounds may then be separated from the solution according to known methods, for instance by precipitation with lime or soda.

As an example the treatment of a finely pulverized concentrate containing 64% of Fe, 0.78% of V and 6.2% of $TiO_2$ may be mentioned. After roasting according to the present invention, extracting the roasted product with a diluted mineral acid and precipitation of the vanadium compounds from the solution it was found that the precipitate contained about 40 times as much of vanadium as the concentrate, and that the precipitate thus was sufficiently rich in vanadium for making possible a production of ferro-vanadium on an industrial scale.

The solution obtained by extracting the roasted product with a diluted mineral acid for dissolving the vanadium compounds has an olive green-blue-yellow green colour, which indicates that the vanadium has not been wholly oxidized to $V_2O_5$ and, consequently, that the oxidation process has been executed strictly in accordance with the present invention.

Numerous experiments executed by applicant have shown that in working according to the present invention it is convenient to separate the gangue from the ore as much as possible and consequently to use the same in the form of concentrate, and moreover that the ore should be exposed to the treatment in a very finely divided condition for facilitating the decomposition of the compound $FeO.V_2O_3$, and consequently for facilitating the transformation of the vanadium compounds into a soluble form, at the same time as it is rendered more difficult to extract other substances occurring in the roasted product. Before roasting the ore or concentrate powder it is convenient to form briquets of the same.

It has also been found convenient to add to the fine ground ore or concentrate before the roasting, a small amount, for instance up to 5% by weight, of a halogen compound of alkali-metal, calcium or magnesium, such as sodium chloride, calcium chloride, fluor-spar, magnesium chloride. By such additions hereinafter called "halogenizing agents" the transformation of the vanadium compounds into soluble form is highly facilitated. In case of adding calcium compounds it is most convenient to use hydro-chloric acid as dissolving agent in order to avoid the formation of gypsum, if the precipitation is made with lime.

Although the roasting temperature may be varied it is convenient to carry on the roasting at temperatures about 950°–1050° C.

I claim:

1. Method of recovering vanadium compounds from iron ores containing vanadium and titanium, consisting in roasting the ore in such a manner that the oxidation of the vanadium compounds wholly up to the stage of $V_2O_5$ is avoided, and treating the roasted product with a dissolving agent for the vanadium compounds.

2. Method of obtaining vanadium compounds from iron ores containing vanadium and titanium, consisting in concentrating the ores so as to form a concentrate, roasting said concentrate in such a manner that the oxidation of the vanadium compounds wholly up to the stage of $V_2O_5$ is avoided, and treating the roasted product with a dissolving agent for the vanadium compounds.

3. Method recovering vanadium compounds from iron ores containing vanadium and titanium, consisting in mixing the starting material with a small amount of a halogenizing agent, roasting said mixture in such a manner that the oxidation of the vanadium compounds wholly up to the stage of $V_2O_5$ is avoided, and treating the roasted product with a dissolving agent for the vanadium compounds.

4. Method of recovering vanadium compounds from concentrates of iron ores containing vanadium and titanium, consisting in finely pulverizing said concentrate, forming briquets of the same, roasting said briquets in such a manner that the oxidation of the vanadium compounds wholly up to the stage of $V_2O_5$ is avoided, and treating the roasted product with a dissolving agent for the vanadium compounds.

5. Method of recovering vanadium compounds from iron ores containing vanadium and titanium, consisting in mixing the finely pulverized ore or concentrate of the ore with fluor-spar, forming briquets thereof, roasting the briquets in such a manner as to prevent the vanadium compounds from being wholly oxidized to the stage of $V_2O_5$ and extracting the vanadium compounds from the roasted product by means of a dissolving agent for the same.

In testimony whereof I have affixed my signature.

BJÖRN PER FERDINAND KJELLBERG.